Figure 1:
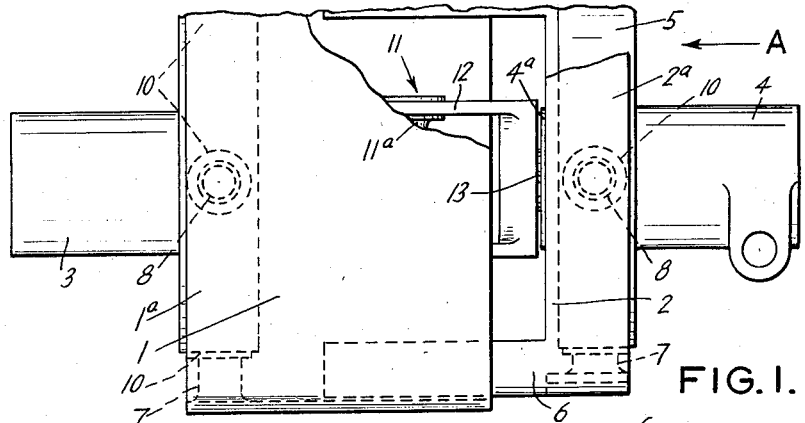

Dec. 16, 1958  G. C. HULSE  2,864,246
UNIVERSAL JOINTS
Filed Oct. 11, 1954  3 Sheets-Sheet 1

Inventor
G. C. Hulse
By Glascock Downing Seebold
Attys.

Dec. 16, 1958

G. C. HULSE 2,864,246

UNIVERSAL JOINTS

Filed Oct. 11, 1954

3 Sheets-Sheet 2

Inventor
G. C. Hulse
By [signature]
Attys.

Dec. 16, 1958 G. C. HULSE 2,864,246
UNIVERSAL JOINTS
Filed Oct. 11, 1954 3 Sheets-Sheet 3

Inventor
G. C. Hulse

United States Patent Office 2,864,246
Patented Dec. 16, 1958

2,864,246
UNIVERSAL JOINTS
Gilbert C. Hulse, Whitehall, Cambridge, New Zealand
Application October 11, 1954, Serial No. 461,440
Claims priority, application New Zealand October 15, 1953
6 Claims. (Cl. 64—21)

This invention relates to universal joints, and in particular relates to universal joints designed to obtain a constant speed ratio between a driving and a driven shaft coupled by the universal joint, such joints, being referred to hereinafter as constant velocity universal joints.

It is well known that the usual kind of universal joint known as the Hooke's or Cardan coupling, does not as a rule operate satisfactorily to transmit power from a driving to a driven shaft when the angle of deviation of the centre line of one shaft from alignment with the centre line of the other shaft is greater than 45 degrees. Furthermore, angularity, between the shafts results in variation of the angular velocity of the driven shaft in proportion to the degree of such angularity. Such variation causes considerably increased wear of moving parts, and is particularly objectionable when the shafts are required to revolve at a high speed, or to transmit considerable power.

Various forms of universal joints, for example those known as the Bendix-Weiss and Rezeppa couplings, have been devised from time to time to overcome the disadvantage of variation in the speed of the driven shaft and to provide a constant angular velocity of the driven shaft in relation to that of the driving shaft at different degrees of angularity between the shafts. Such known constant velocity universal joints present the serious disadvantage of being virtually ineffective at degrees of angularity between the shafts of greater than 20 to 30 degrees.

The main object of the present invention is therefore to provide an improved constant velocity universal joint which will ensure a constant angular velocity of a driven shaft in relation to a driving shaft, and which will operate effectively with a degree of angularity greater than with known kinds of universal joints.

The improved constant velocity universal joint according to the present invention is adapted to couple adjacent ends of two shafts for the transmission of power therebetween, and consists of a pair of telescoping members locked against rotation relative to each other and disposed around the adjacent end portions of the shafts; each shaft being mounted universally within one said member yet so as to be fixed against rotation relative thereto, and the adjacent ends of the shafts being universally coupled together.

The shafts may be universally mounted within the sliding members in any known way; or each shaft may be pivotally mounted between the arms of a yoke or collar which is itself pivotally mounted within, and transversely of, one of the telescoping members. In such an arrangement, the shaft is pivoted within the yoke or collar in a plane which is at right angles to the plane in which the yoke or collar is pivoted within its said member, so that each shaft is capable of universal movement in relation to its members.

The universal coupling between the adjacent ends of the shafts may also be of any usual kind, such as a ball and socket joint or a Hooke's coupling and such coupling may be made separate from the shafts with the stems of the coupling mounted within or around the ends of the shafts so that the coupling is capable of rotational but not of axial movement in relation to the shafts.

Figure 2:
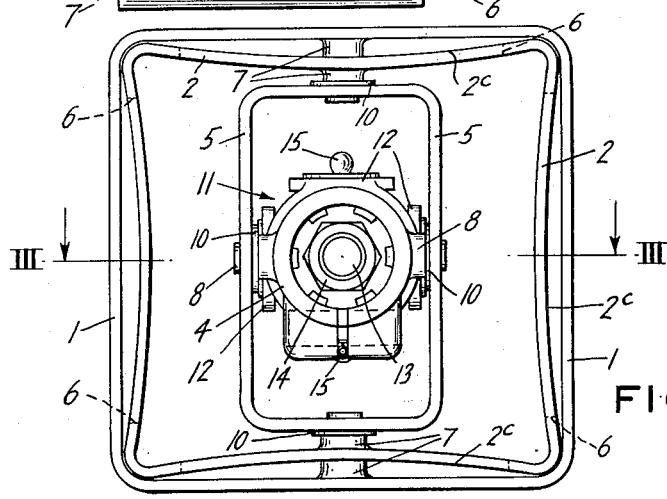
Figure 3:
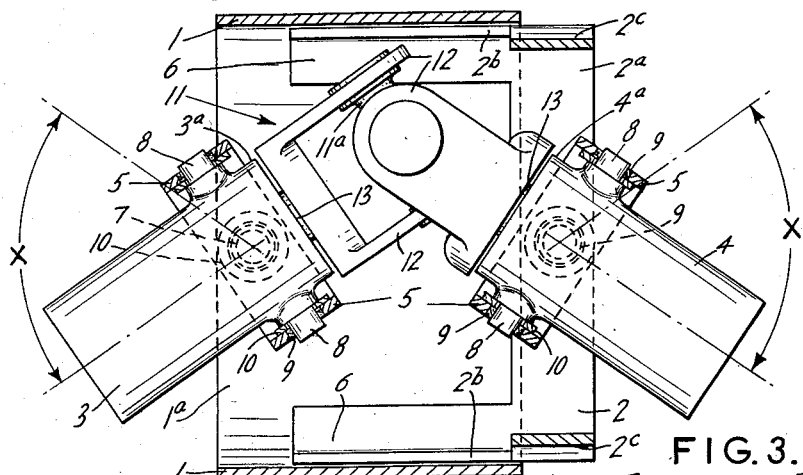
Figure 4:
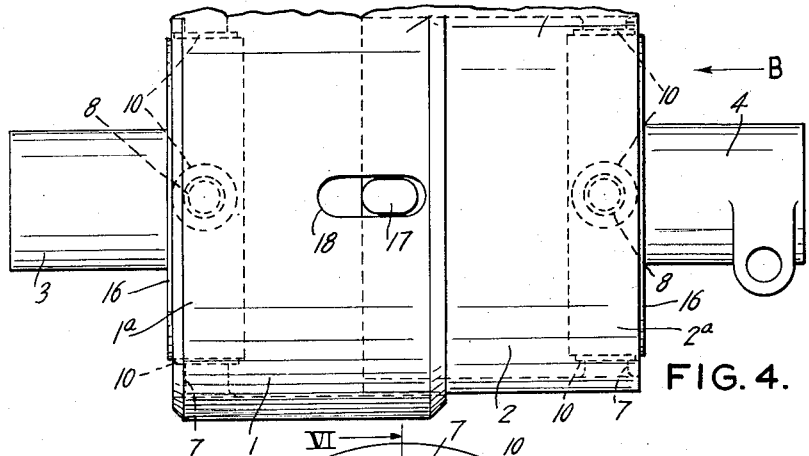
Figure 5:
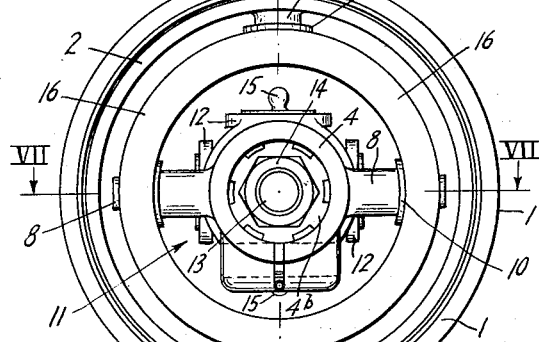
Figure 6:
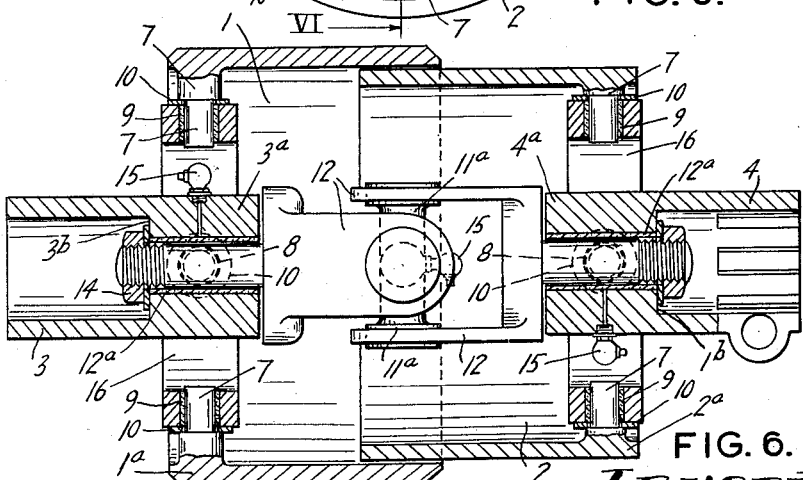
Figures 7, 8, 9:
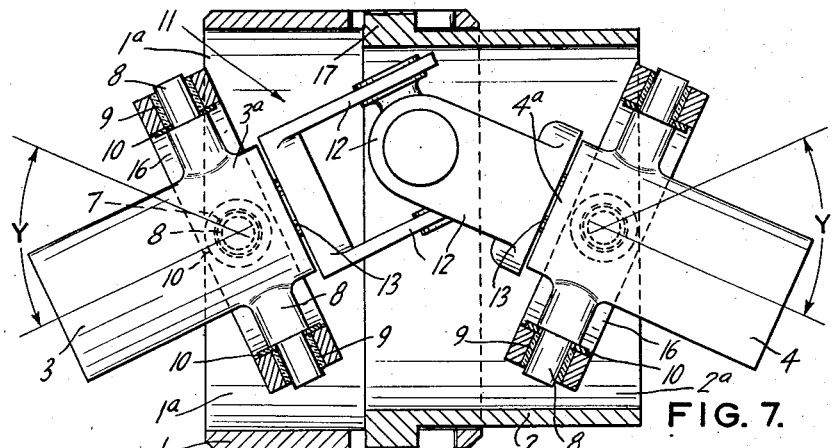

The invention will, however be more particularly described with reference to the accompanying drawings in which:

Figure 1 is a side elevation (partly broken) of a joint made in accordance with the first form of this invention, Figure 2 is an end elevation view in the direction of the arrow A of Figure 1, Figure 3 is a sectional plan taken on the line III—III of Figure 2, showing the driving and driven shafts at an angle to one another, Figure 4 is a side elevation of a joint made in accordance with the second form of this invention, Figure 5 is an end elevation viewed in the direction of arrow B of Figure 4, Figure 6 is a sectional elevation taken on the line VI—VI of Figure 5, Figure 7 is a sectional plan taken on the line VII—VII of Figure 5, and showing the driving and driven shafts at an angle to one another, Figure 8 is a side elevation (partly broken) of a joint made in accordance with the third form of this invention, and Figure 9 is an end elevation viewed in the direction of arrow C of Figure 8.

As shown in Figures 1 to 3 of the drawings, the telescoping members 1 and 2 are of square cross-section, and embrace the end portions 3a and 4a of the shafts 3 and 4, which are pivoted in yokes or collars 5 extending between opposing walls of the telescoping members 1 and 2 at the outer ends 1a and 2a of such members 1 and 2. In order to minimise friction between the members 1 and 2 also for the sake of economy in construction, the walls of the internal telescoping member 2 may be cut away on the portion 2b of the member which slides within the external member 1, to leave only four legs or guides 6 at the four corners of that portion of the internal telescoping member 2. If desired four bolts or the like may project from the internal member 2 and pass through guides in the external member 1 to facilitate telescoping of the two members 1 and 2.

To minimise friction, the walls of the internal telescoping member 2 may be depressed as at 2c between the corners of the member 2, so that the corners alone of the member 2 are in contact with the external telescoping member 1.

The yokes or collars 5 within which the shafts 3 and 4 are mounted are link-shaped, having their central portions pivotally attached to the shafts 3 and 4, and having at either end axial stems 7 which are journalled in opposite walls of the telescoping members 1 and 2. The shafts 3 and 4 are mounted centrally in the yokes or collars 5, on pins 8 passing through the arms of the yoke 5, and each shaft 3 and 4 pivots in the plane of its yoke or collar 5. Each yoke or collar 5 is mounted centrally and transversely of its member 1 and 2, and extends between mid-points of the opposite walls of the member so that each yoke or collar 5 pivots in a plane which is at right angles to the plane of the yoke or collar 5. Thus the shafts 3 and 4 are capable of universal movement in relation to the members 1 and 2.

Bushings 9 and washers 10 may be provided where the yokes or collars 5 pivot on the axial stems 7 and where the shafts 3 and 4 pivot in the yokes or collars 5 to allow easy pivoting of the parts.

The adjacent ends of the shafts 3 and 4, within the telescoping members 1 and 2, are connected by a Hooke's universal coupling, generally indicated at 11, and each half of the coupling 11 comprising yoked arms 12 mounted on a stem 13. The stem 13 is fitted within the ends of the shaft 3 or 4 so as to be capable of rotation, but incapable of axial movement, relative to the shafts 3 or 4.

The stems 13 of the coupling 11 are held in the ends of their respective shafts 3 and 4 by nuts 14 (see Figure 6) bearing on internal flanges 3b and 4b in the shafts 3 and 4 and are screwed onto the stems 13. Each stem 13 may act as a bearing for rotational movement of the coupling 11 in relation to the shafts 3 and 4 or separate bushings 12a may be provided to allow easy pivoting of the coupling 11.

Alternatively the stems 13 of the coupling 11 may be secured on the ends of the shafts 3 and 4 by a pair of semi-circular collets engaging annular grooves of the stems 13 and the collets have a pair of opposing tangential grooves which engage a pair of studs passing through the shaft on either side of the stem allowing rotational movement but not axial movement of the coupling 11 in the shafts 3 and 4.

To enable the Hooke's coupling to operate through a wide variation in the angular relationship of the shafts, the arms of the yokes or collars may be narrowed at the waist, and thickened on each face for reinforcement.

The stems 13 or bushings 12a of the coupling 11 and the central cross pivot 11a of the coupling 11 between the yoke arms 12, may be kept greased easily by the provision of grease nipples 15 on these parts.

In a second form of this invention, as shown in Figures 4 to 7, the telescoping members 1 and 2 are circular in cross-section and embrace the end portions 3a and 4a of the shafts 3 and 4 which are pivoted in annular rings or collars 16 corresponding to the yokes 5 in the first form of this invention.

The shafts 3 and 4 are pivoted on pins 8 extending therefrom and pivotally connected to the annular rings or collars 16 by means of bushings 9 and washers 10. Similarly the annular rings or collars 16 are in turn pivotally connected to the telescoping members 1 and 2 by axial pins 7 extending from the members 1 and 2, and the pins 7 pass through bushings 9 and washers 10 on the annular rings or collars 16, so that each ring or collar 16 pivots in a plane which is at right angles to the pivotal plane of the shafts 3 and 4 in the rings or collars 16.

To guide the telescoping members 1 and 2 and also to form a driving connection between the driving shaft 3 and the driven shaft 4, pins, studs or projections 17 extend from the internal telescoping member 2 and pass through slots 18 in the external telescoping member 2 and pass through slots 18 in the external telescoping member 1 so as to form a guide for the telescoping members 1 and 2 and to prevent independent rotation of the telescoping members 1 and 2.

A third form of this invention is shown in Figures 8 and 9 where the telescoping members 1 and 2 are circular in cross-section and are guided and prevented from independent rotation by means of splines 19 on the outer face of the internal casing 2 sliding in grooves 20 on the inner face of the external casing 1. The splines 19 and grooves 20 may extend the full length of the telescoping members 1 and 2 respectively or may be formed adjacent the inner ends 1d and 2d of the members 1 and 2.

In this third form of the invention, as in the first two forms, the shafts 3 and 4 are connected by a Hooke's universal coupling 11 and are held in the telescoping members 1 and 2 by annular rings or collars 16 to which the shafts 3 and 4 and the telescoping members 1 and 2 are pivoted.

When the improved universal joint is in use, for example to transmit power between a driving shaft 3 and a driven shaft 4, the power is transmitted through the two universal connections formed by the pivotal connection of the collars 5 and 16 to the telescoping members 1 and 2 and the shafts 3 and 4 so that the telescoping members 1 and 2 rotate with the shafts 3 and 4 as the drive is transmitted from one shaft 3 to the other shaft 4; while the intermediate Hooke's coupling 11 between the ends of the shafts 3 and 4 maintains the said two connections in correct angular relationship to each other to ensure a constant velocity drive. The intermediate coupling 11 also spaces the shafts 3 and 4 at the desired axial distance from each other, and prevents the telescoping members 1 and 2 from sliding apart or moving together to more than the desired extent.

The drive from the driving shaft 3 to the driven shaft 4 is transmitted through the telescoping members 1 and 2 and the angular thrust imparted by the rotating shafts 3 and 4 when at an angle to each other, is compensated for by the pivotal connections to the telescoping members 1 and 2 through the collars 5 and 12, allowing free sliding movement and preventing binding of the telescoping members 1 and 2 even where acute angles between the driving shaft 3 and the driven shaft 4 are encountered.

The cross sectional area of the telescoping members 1 and 2 is sufficient to enable the shafts 3 and 4 to pivot through a wide angle in relation to the members 1 and 2, and the dimensions of the members 1 and 2 are in this respect determined by the length of each shaft 3 or 4 which extends into its member 1 or 2 beyond the point at which the shaft 3 or 4 is pivoted to the member 1 or 2. As will be seen from Figures 3 and 7 the angle through which the shafts 3 and 4 can operate is indicated by the angles $x$ and $y$ respectively.

The constant-velocity universal joint constructed according to the invention provides a highly serviceable universal joint which ensures a constant angular velocity of a driven shaft 3 connected by the said joint to a driving shaft 4, and which will at the same time operate through a wide degree of angularity of the driving and driven shafts 3 and 4.

The universal joint according to the invention is applicable to a wide variety of uses, and is for example of great benefit in the transmission of power from the power take-off of a tractor to trailing farm implements, such as manure distributors, orchard sprayers and the like. The wide angle of operation of the universal joint is of particular benefit in such cases where it is necessary to turn sharply at the end of a "land" in cultivating a field, or an orchard or the like with narrow headings.

Many other applications of the universal joint according to the invention will be evident to those in the trades concerned.

In addition to the features of construction above described, the invention includes such other variations and modifications of those features as rightly lie within the nature and scope of the invention.

What I do claim and desire to obtain by Letters Patent of the United States of America is:

1. A constant velocity universal joint adapted to couple adjacent ends of a driving and a driven shaft for the transmission of power therebetween and the joint consisting of a pair of axially slidable telescoping members locked against rotation relative to each other, a shaft end mounted universally within each of said telescoping members and adjacent ends of said shafts being joined by a universal coupling which is adapted to rotate with respect to said shafts but secured against axial movement relative thereto so that the telescoping members rotate with the shafts as the drive is transmitted from one shaft to the other shaft through the telescoping members.

2. A constant velocity universal joint as claimed in claim 1 wherein the telescoping members are square in cross-section and embrace the end portions of driving and driven shafts, and the internal telescoping member has walls cut away or depressed from the portion which slides within the external telescoping member to provide legs or guides at the corners of the internal telescoping member whereby the telescoping members rotate with the shafts.

3. A constant velocity universal joint as claimed in claim 1 wherein the telescoping members are circular in cross-section and embrace the end portions of driving and driven shafts and the internal telescoping member has at least one pin which passes through a corresponding slot in the external telescoping member to provide guide and driving means for the telescoping members as the telescoping members rotate with the shafts.

4. A constant velocity universal joint as claimed in claim 1 wherein the telescoping members are circular in cross-section and embrace the end portions of the driving and driven shafts, and the internal telescoping member and the external telescoping member are splined together to provide for telescoping one on the other as the telescoping members rotate with the shafts.

5. A constant velocity universal joint as claimed in claim 3 wherein each telescoping member is pivotally mounted on a yoke or collar, and a yoke or collar is pivotally mounted on each of a driving or a driven shaft whereby each shaft pivots in a plane which is at right angles to the plane in which each yoke or collar pivots in its telescoping member.

6. The universal joint of claim 1, in which said universal coupling comprises a pair of stemmed yokes, one of which is fitted axially in each of said shaft ends and mounted for rotation therein, a cross pivot mounted between said yokes to provide for universal movement between said stems, and means to restrain said stems against axial movement with respect to said shaft ends.

References Cited in the file of this patent

UNITED STATES PATENTS 2,329,903    Horne _____ Sept. 21, 1943

FOREIGN PATENTS 793,629    France _____ Nov. 23, 1935